A. W. BROWNE & R. P. NICHOLS.
PROCESS OF REFRIGERATION.
APPLICATION FILED DEC. 3, 1912.
1,246,866.
Patented Nov. 20, 1917.
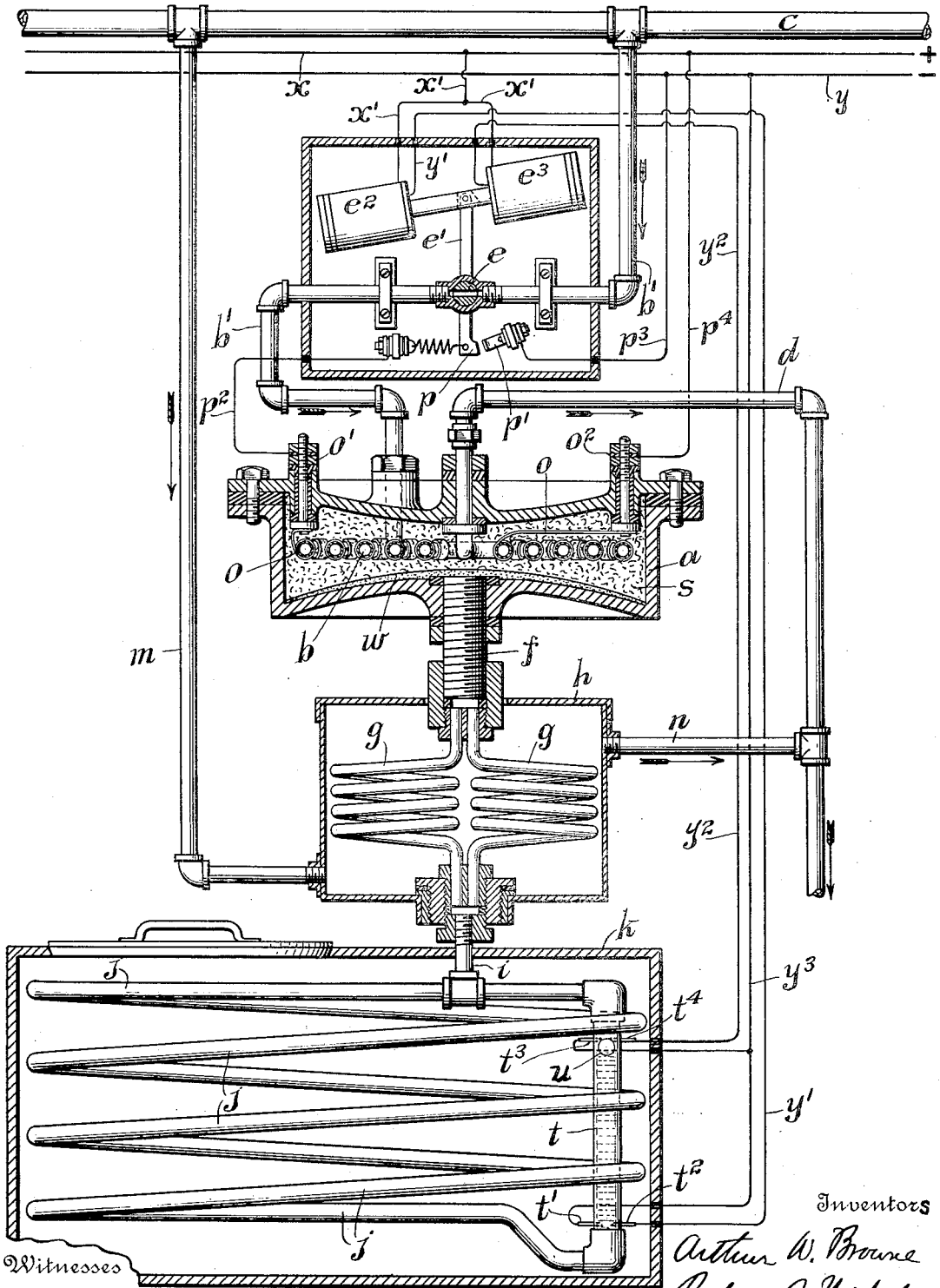

UNITED STATES PATENT OFFICE.

ARTHUR W. BROWNE, OF ITHACA, NEW YORK, AND ROBERT P. NICHOLS, OF PHILADELPHIA, PENNSYLVANIA.

PROCESS OF REFRIGERATION.

1,246,866.  Specification of Letters Patent.  Patented Nov. 20, 1917.

Application filed December 3, 1912. Serial No. 734,672.

*To all whom it may concern:*

Be it known that we, ARTHUR W. BROWNE, a citizen of the United States, and resident of Ithaca, county of Tompkins, State of New York, and ROBERT P. NICHOLS, a citizen of the United States, and resident of Philadelphia, county of Philadelphia, State of Pennsylvania, have invented an Improvement in Processes of Refrigeration, of which the following is a specification.

More particularly our invention relates to a process of refrigeration by the absorption of a gas, such as ammonia, from the refrigerating pipes arranged in the zone of refrigeration. It is well known that water has been used in this manner as the absorber for the ammonia gas. It has also been proposed to use certain chemical salts, such as ammonium thiocyanate and ammonium nitrate, which are readily soluble in the ammonia which they absorb, and the use of calcium chlorid as an absorbent has also been suggested.

When water is used as the absorber without a pump it has been found extremely difficult, if not impossible, to prevent the distillation of part of the water with the ammonia gas on heating the ammonium hydroxid. To prevent this a reflux or dephlegmator must be used, but even then more or less water eventually accumulates in the refrigerating coils, retarding, and sometimes stopping, the reabsorption of the ammonia.

When chemical salts are used that are very soluble in ammonia, they form a liquid when they absorb the ammonia gas, and in this there are several disadvantages. The chief of these is that when heat is applied to drive off the ammonia gas, there is considerable decomposition of the salt itself. Some of the products of this decomposition are volatile and are distilled into the refrigerating coils and there condensed. This has a tendency to retard the evaporation of the liquid ammonia from the coils and also reduces the power of the salt as an absorbing agent. The decomposition may moreover in certain cases result in the production of dangerously high pressures, and even of explosive gas mixtures. It is well known, for example, that nitrous oxid may be formed by the heating of ammonium nitrate, and that mixtures of nitrous oxid and ammonia explode violently under certain conditions. There are still other objections to the use of liquids as absorbers, such as the necessity of using agitating or bubbling devices to promote the absorption of the ammonia gas on its return to the absorber, and the difficulty of shipment without spilling liquid into the refrigerating coils.

It is the object of our invention to overcome these objections to absorption methods of refrigeration, and this we accomplish by the use of anhydrous copper sulfate as a type of solid absorber, capable of absorbing the ammonia gas, without liquefaction and without decomposition at the temperatures normally used in a refrigerating process of this kind.

By "solid absorbers" are meant absorbers which are practically anhydrous, as the presence of moisture in appreciable quantity will render the ammonate more or less subject to liquefaction or decomposition and incapable of acting efficiently in a refrigerating process.

In carrying out our process the solid absorber with its contents of absorbed refrigerant is placed in a suitable chamber adapted to be alternately heated and cooled. When the absorber is heated the refrigerating agent is given off in the form of a gas; this gas is then condensed into a liquid, and the liquid passes into the refrigerating coils. This liquid is then evaporated in the refrigerating coils by relieving the pressure in the system by cooling the absorber, and the gas thus produced passes back to and is reabsorbed by the absorber. This reconversion of the liquid into a gas in the refrigerating coils acts in the well known manner to take up the heat from its surroundings and to produce the desired refrigeration.

We have found the ammonate of copper sulfate ($CuSO_4.5NH_3$) excellently suited to our process, and we claim this substance specifically. This substance is obtained from the blue crystals of the salt ($CuSO_4.5H_2O$), which when dehydrated forms a white substance ($CuSO_4$). This substance ($CuSO_4$) will absorb as many molecules of ammonia ($NH_3$) as the original salt contained of water, without liquefaction, so that we have the solid ammonate ($CuSO_4.5NH_3$). When this is heated to the proper degree the ammonia is given off in the form of a gas and passes to the condenser where it is liquefied. Thence it flows into the refrigerating coils, and when the pressure is reduced by the cooling of the absorber ($CuSO_4$), it will return into gaseous form and be reabsorbed by the absorber, which at all times remains in a solid form.

In the accompanying drawings we have shown diagrammatically an apparatus for carrying out the process, with the valve chamber, the container for the absorber, the condenser, and the refrigerating chamber in section.

$a$ is a container for the solid absorber with its absorbed refrigerant $s$ in which is arranged a coil of pipe $b$, supplied by a pipe $b'$ from the water main $c$, and discharging through a pipe $d$. Through this pipe $b'$ water is supplied to the coil $b$ from the main $c$, under the control of a valve $e$.

From the container $a$ a discharge pipe $f$ leads to the condensing coils $g$ in the condenser $h$, and these condensing coils communicate through a pipe $i$ with the refrigerating coils $j$ in the refrigerating chamber $k$.

A pipe $m$ leads from the water main $c$ to the condenser and a discharge pipe $n$ leads from the condenser to the discharge pipe $d$.

Suitable means are employed for alternately heating and cooling the material $s$ in the container $a$. For the purpose of heating the material we have shown an electrical heater consisting of a resistance ribbon $o$ arranged about the coil and connected with the binding posts $o'$, $o^2$. The cooling is effected by the passage of water through the coil when the valve $e$ is opened and the current through the heater $o$ is cut off.

As shown the valve $e$ is operated electrically through a lever $e'$ controlled by the solenoids $e^2$, $e^3$, and the lever is provided with a switch $p$, $p'$ in the circuit $p^2$, $p^3$, $p^4$ which includes the heater $o$.

In the apparatus shown the heating and cooling of the solid material $s$ in the container $a$ is controlled automatically by the conditions in the refrigerating coils $j$. For this purpose there is arranged in the coils $j$ a vertical tube $t$ having at the bottom and top a pair of electrical contacts $t'$, $t^2$ and $t^3$, $t^4$ respectively. These are controlled by a metallic float $u$.

One winding of the solenoids $e^2$, $e^3$ is connected by the conductor $x'$ with the one wire $x$ of the main circuit. The other windings of the solenoids $e^2$, $e^3$, are connected by the wires $y'$, $y^2$, with the contacts $t^2$, $t^4$ respectively. The contacts $t'$ and $t^3$ are connected by the wire $y^3$ with the return $y$.

The operation is as follows:

When the valve $e$ and switch $p$, $p'$ are closed current will pass through the heater $o$ heating the material $s$ and causing the ammonia or other refrigerating agent to separate from the absorber and pass in the form of a gas into the condenser $h$. Here the gas will be condensed by the cold water circulating through the pipes $m$, $n$, and the pressure created will flow in a liquid state through the pipe $i$ into the refrigerating coils $j$. As the liquid accumulates in the refrigerating coils it will rise in the tube $t$ and lift the float $u$ until it closes the circuit through the contacts $t^3$, $t^4$. This will immediately energize the other solenoid and operate the lever $e'$ to open the valve $e$ and the switch $p$, $p'$. Current will then be cut off to the heater in the container $a$ and cold water will flow through the coil $b$. This will immediately lower the temperature and pressure in the apparatus, with the result that the liquid in the refrigerating coils will be reconverted into gas and reabsorbed by the absorber in the container. When the refrigerant is thus reconverted into gas and reabsorbed from the coils $j$ the float $u$ will descend and close the circuit between the contacts $t'$, $t^2$, thus energizing the other solenoid and closing the valve $e$ and switch $p$, $p'$. The material in the container $a$ will then be again heated to give off the refrigerating gas and the operations described will be repeated.

To prevent any of the material in the container $a$ passing in a solid form from the container, a porous screen $w$ may be arranged over the outlet to the pipe $f$.

The apparatus which we have shown will have more or less of an intermittent refrigerating action, but that will ordinarily be sufficient, and where a continuous heat absorption is required in the refrigereating room or chamber, a plurality of such units may be employed, set to act alternately or in succession.

While we have shown an electrical heater in the container $a$ for heating the material to liberate the refrigerant gas, and have also shown the apparatus under electrical control by the conditions in the refrigerating coils, our process is not limited to the use of such means; and while we do not here claim the apparatus shown we reserve the right to patent the same in a separate application.

What we claim is as follows:

1. The method of refrigerating which comprises heating anhydrous ammonate of copper sulfate within ranges of temperature and pressure lower than the fusion or decomposition point of the same, utilizing the resultant solid anhydrous copper sulfate as the absorbent and cyclically repeating the aforesaid steps.

2. The method of refrigerating which comprises heating substantially anhydrous ammonate of copper sulfate within ranges of pressure and temperature lower than the fusion or decomposition point of the same to thereby gasify ammonia therefrom, condensing the resulting ammonia in the form of a substantially anhydrous liquid, leading the resulting substantially anhydrous ammonia through suitable refrigerating passages, withdrawing the substantially anhydrous ammonia from said refrigerating passages in the form of a substantially anhydrous gas under conditions of reduced pressure and temperature to the resultant substantially anhydrous solid copper sulfate to again form the substantially anhydrous solid ammonate of copper sulfate, and cyclically repeating the aforesaid steps.

In testimony of which invention, we hereunto set our hands.

ARTHUR W. BROWNE.
ROBERT P. NICHOLS.

Witnesses as to Arthur W. Browne:
 JAS. R. ROBINSON, Jr.,
 B. T. COOK.

Witnesses as to Robert P. Nichols:
 A. M. KELLY,
 E. W. SMITH.